United States Patent
Yamamoto et al.

(10) Patent No.: US 10,650,203 B1
(45) Date of Patent: May 12, 2020

(54) RFID TAG, SYSTEM, AND METHOD FOR TAMPER DETECTION

(71) Applicant: Konica Minolta Laboratory U.S.A., Inc., San Mateo, CA (US)

(72) Inventors: Kazuto Yamamoto, Foster City, CA (US); Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 16/197,921

(22) Filed: Nov. 21, 2018

(51) Int. Cl.
| | | |
|---|---|---|
| *G06K 19/06* | (2006.01) | |
| *G06K 7/10* | (2006.01) | |
| *G06K 19/077* | (2006.01) | |

(52) U.S. Cl.
CPC ... *G06K 7/10366* (2013.01); *G06K 19/07773* (2013.01)

(58) Field of Classification Search
USPC .................................................. 235/487–494
See application file for complete search history.

(56) References Cited

U.S. PATENT DOCUMENTS

| | | |
|---|---|---|
| 6,265,977 B1 | 7/2001 | Vega et al. |
| 7,510,985 B1 | 3/2009 | Boenke et al. |
| 2006/0232477 A1 | 10/2006 | Ollikainen |
| 2008/0001829 A1 | 1/2008 | Rahola et al. |
| 2008/0018477 A1* | 1/2008 | Forster .............. G06K 19/0717 340/572.7 |
| 2009/0108993 A1 | 4/2009 | Forster |
| 2009/0166431 A1 | 7/2009 | Aoyama |
| 2013/0134224 A1 | 5/2013 | Sabbah |

FOREIGN PATENT DOCUMENTS

| | | |
|---|---|---|
| JP | 2010035789 A | 2/2010 |
| JP | 2010081276 A | 4/2010 |
| JP | 2014016884 A | 1/2014 |
| WO | WO 2013/072578 A1 | 5/2013 |

OTHER PUBLICATIONS

U.S. Appl. No. 16/197,631, filed Nov. 21, 2018, Soriano et al.
U.S. Appl. No. 16/197,712, filed Nov. 21, 2018, Soriano et al.

* cited by examiner

*Primary Examiner* — Jamara A Franklin
(74) *Attorney, Agent, or Firm* — Squire Patton Boggs (US) LLP

(57) ABSTRACT

Tamper detection on an article is performed by reading data from an RFID tag having an antenna with segments designed to break apart. The RFID tag is secured to the article in such a way that, when the article is tampered with, the antenna segments will break apart. Detachment would decrease the reading range of the RFID tag. An RFID reader may be used to read the data from the RFID tag. The predefined reading range (Rp) of the RFID tag, with antenna segments entact, is obtained from the data which was read by the RFID reader. The RFID reader obtains the data while located at an actual reading range (Ra) relative to the RFID tag. By comparing Ra with Rp, it is determined whether the antenna is still entact. If Ra<Rp, the antenna is likely to be broken apart, thereby indicating that the article has been tampered with.

20 Claims, 6 Drawing Sheets

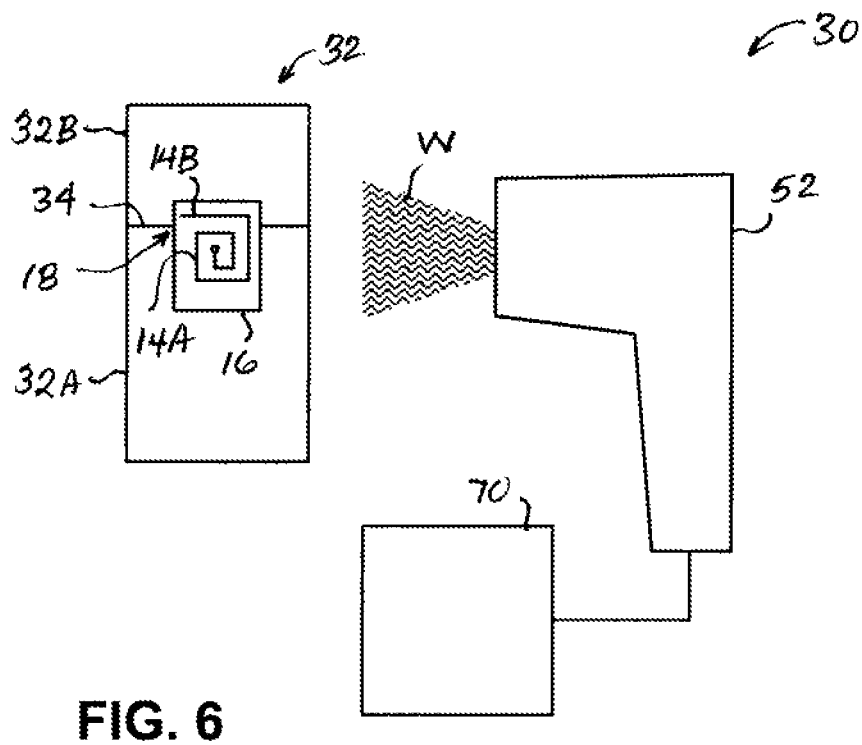
FIG. 6
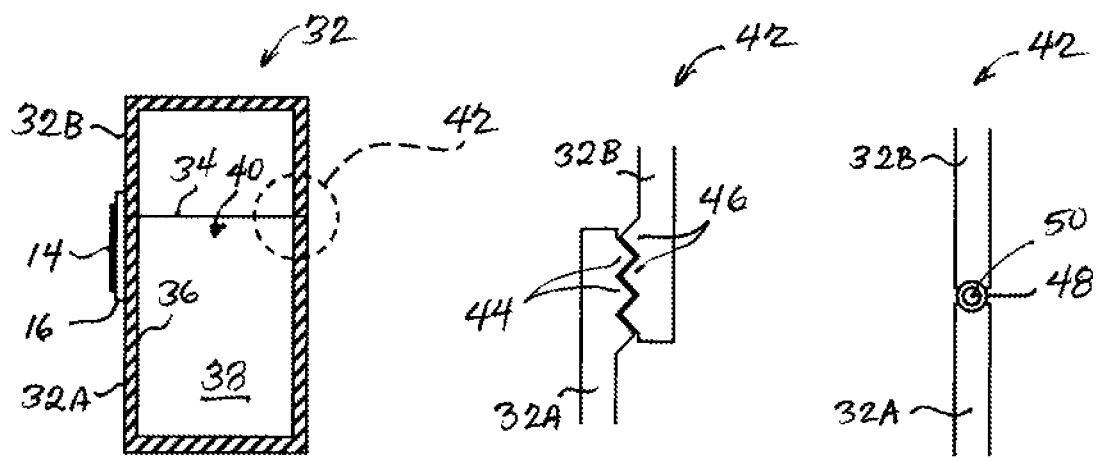
FIG. 7  FIG. 8  FIG 9

RFID TAG, SYSTEM, AND METHOD FOR TAMPER DETECTION

FIELD

This disclosure relates generally to RFID devices, more particularly, to an RFID tag, system, and method for tamper detection.

BACKGROUND

Situations arise when one wants to determine whether an article has been tampered with, opened, or altered in some way. For example, one may want to determine whether a container of food or medicine has been opened previously. The determination could be performed visually, such as by looking to see whether a seal has been broken or by looking for other visible signs of tampering. However, the container may be stored in a sealed box, so visual inspection would require opening the sealed box. In addition, a shipment may have many containers, so visual inspection might be performed on only a small sample of containers due to limits on time. Accordingly, there arises a need for a device, system, and method for determining whether an article has been tampered with, without requiring visual inspection, and which can allow for rapid determination on a large number of articles.

SUMMARY

Briefly and in general terms, the present invention is directed to an RFID tag, RFID system, and RFID reading method.

In aspects of the invention, an RFID tag comprises a chip storing data representing a predefined reading range, and an antenna comprising a first antenna segment and a second antenna segment operatively attached to the first antenna segment so as to form a circuit with the first antenna segment. The second antenna segment is configured to detach from the first antenna segment. The antenna has an initial state in which the first antenna segment is attached to the second antenna segment and a modified state in which the first antenna segment is detached from the second antenna segment. The antenna is configured to transmit the data from the chip when the antenna is at the initial state and the modified state.

In aspects of the invention, an RFID system comprises an article, and an RFID tag. The article comprises a first article part and a second article part movable relative to the first article part. The RFID tag comprises a chip storing data representing a predefined reading range, and an antenna comprising a first antenna segment and a second antenna segment operatively attached to the first antenna segment so as to form a circuit with the first antenna segment. The second antenna segment is configured to detach from the first antenna segment. The antenna has an initial state in which the first antenna segment is attached to the second antenna segment and a modified state in which the first antenna segment is detached from the second antenna segment. The antenna is configured to transmit the data from the chip when the antenna is at the initial state and the modified state. The first antenna segment is disposed over and secured to the first article part. The second antenna segment is disposed over and secured to the second article part such that, with movement of the second article part relative to the first article part, the second antenna segment moves with the second article part and detaches from the first antenna segment.

In aspects of the invention, an RFID reading method comprises obtaining data from an RFID tag by using an RFID reader, the data representing a predefined reading range and being obtained by the RFID reader at an actual reading range. The RFID tag comprises a chip and an antenna, the chip storing the data, the antenna comprising a first antenna segment and a second antenna segment operatively attached to the first antenna segment so as to form a circuit with the first antenna segment. The second antenna segment is configured to detach from the first antenna segment. The antenna has an initial state in which the first antenna segment is attached to the second antenna segment and a modified state in which the first antenna segment is detached from the second antenna segment. The method comprises using the obtained data to determine whether the actual reading range is less than the predefined reading range. The method comprises performing a determination step comprising either determining that the antenna is at the modified state when the actual reading range is determined to be less than the predefined reading range, or determining that the antenna is at the initial state when the actual reading range is determined to be not less than the predefined reading range.

The features and advantages of the invention will be more readily understood from the following detailed description which should be read in conjunction with the accompanying drawings.

BRIEF DESCRIPTION OF THE DRAWINGS

FIG. 6 is a schematic diagram showing an example system comprising the RFID tag, an RFID reader, and a host computer.

FIG. 7 is a cross-section view showing the RFID tag secured to an article having first and second article parts.

FIGS. 8 and 9 are cross-section views showing details of a connection region that holds the first and second article parts together.

FIG. 12 is a flow diagram showing an example RFID reading method for determining whether the article has been tampered with.

DETAILED DESCRIPTION

Figure 1:
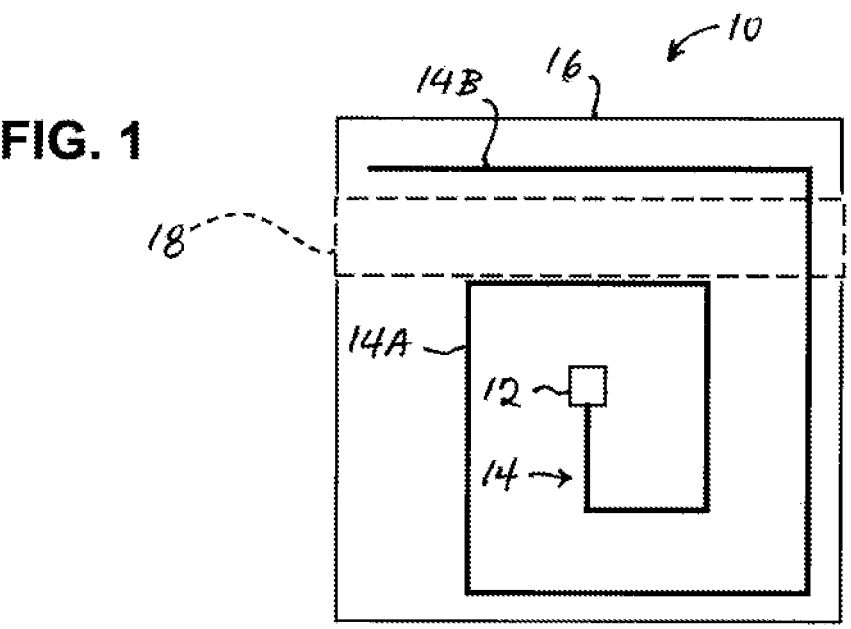
FIG. 1 is plan view showing an example RFID tag having an antenna in an initial state.

As described herein, an RFID tag may be used to determine whether an article has been tampered with. As used herein the terms "tamper," "tampered," and the like encompass a state in which an article has been opened, opened and then closed, altered, or manipulated. The RFID tag allows the determination to be made without visual inspection of the article. Use of multiple RFID tags may allow for rapid determination on a large number of articles.

Radio frequency identification (RFID) is a technology that works on radio frequency signals. An RFID system often comprises three main components: (1) an RFID tag which stores data is usually attached to an article that one desires to identify and/or track; (2) an RFID reader that communicates with the RFID tag using radio frequency signals to obtain data from the RFID tag; and (3) a host data processor, such as a computer, that uses the data obtained by the RFID reader from the RFID tag. If the RFID tag is within range of the radio frequency signals (i.e., radio waves) from the RFID reader, a communication link is established and the RFID tag replies with data to the RFID reader. Based on this reply, the RFID reader may identify the article.

There are various types of RFID tags. Passive RFID tags do not include an onboard power source, such as a battery. Passive RFID tags rely on power derived from radio waves from the RFID reader to transmit a reply to the RFID reader. Active RFID tags include an onboard power source to power its internal circuitry and to enable transmission of a reply to the RFID reader. Semi-passive RFID tags include an onboard power source to power its internal circuitry but relies on power derived from the radio waves from the RFID reader to transmit a reply to the RFID reader.

A useful characteristic of an RFID tag is range, which refers to the maximum distance between an RFID reader and RFID tag for a communication link between the two RFID devices. The range is affected by various factors, such as background radio frequency noise, surrounding structures that may affect the radio waves from the RFID reader, antenna configurations of the reader and tag, relative orientation (angle) between the reader and tag, and carrier frequency. RFID systems may operate in different frequency bands. In the low frequency (LF) band, a carrier frequency of 125 kHz or 134 kHz, for example, may provide a range up to 10 cm. In the high frequency (HF) band, a carrier frequency of 13.58 MHz, for example, may provide a range up to 1 meter. In the ultra high frequency (UHF) band, a carrier frequency within 860-960 MHz, for example, may provide a range up to 15 meters.

As mentioned above, the range is affected by antenna configuration in the RFID tag. For example, a relatively large RFID tag antenna may allow more energy to be derived from radio waves from an RFID reader, thereby allowing the RFID tag to respond from a greater distance.

A predefined range of a particular type of RFID tag may be determined in a pre-testing procedure, such as by using an RFID reader operating at a known frequency and power under known test conditions (e.g., known amount of background RF noise, known orientation (angle) between reader and tag, etc.). As will be described below, the antenna of the RFID tag has initial and modified states. The pre-testing procedure is performed with the antenna in the initial state and is not performed to detect tampering. Various test techniques may be used to determine a predefined reading range during the pre-testing procedure. In a technique referred to herein as position thresholding, the distance of the RFID reader from the RFID tag is adjusted while the RFID reader emits radio waves. The distance is adjusted until the radio waves induce the RFID tag to send a response to the RFID reader, or until the RFID reader detects a backscatter signal from the RFID tag. In a technique referred to herein as signal thresholding, the position of the RFID reader may be fixed (RFID reader does not move relative to the RFID tag) while characteristics of the radio waves from the antenna of the RFID reader are adjusted. The radio wave characteristics are adjusted until the radio waves induce the RFID tag to send a response to the RFID reader, or until the RFID reader detects a backscatter signal from the RFID tag. The radio wave characteristics that result in the response may be used, in formulas and models known in the art, to calculate a predefined reading range. The test may be performed while the RFID tag is secured to an article. Multiple tests may be performed on one RFID tag or multiple RFID tags of the same type, and the results may be averaged to determine a predefined reading range during the pre-testing procedure.

After a value for the predefined range is determined during the pre-testing procedure, the predefined reading range may be written or otherwise stored to the chip of similar RFID tags that will be secured to articles. In addition to the predefined reading range, an Electronic Product Code (EPC), Universal Product Code (UPC), or other product identifier may be written to the chip. The writing process may be performed as part of the RFID tag fabrication process. The RFID tags, which contain data representing their predefined ranges, may be used to determine whether the articles on which they are secured have been tampered with. Tamper determination, as described below, involves using an RFID reader to obtain the predefined reading range (Rp) and then checking whether the actual reading range (Ra) of the RFID tag is less than Rp. If Ra<Rp, then the user may ascertain that the article, on which the RFID tag is secured, has been tampered with. If Ra≥Rp (i.e., not Ra<Rp), then the user may ascertain that the article, on which the RFID tag is secured, has not been tampered with.

Referring now in more detail to the drawings for purposes of illustrating non-limiting examples, wherein like reference numerals designate corresponding or like elements among the several views, there is shown in FIG. 1 example RFID tag 10 comprising chip 12 and antenna 14 configured transmit data from the chip. Chip 12 is a silicon device (integrated circuit) having pads that are operatively attached to antenna 14, which is a conductive circuit. As used herein, the term "conductive" means electrically conductive. As used herein "operatively attached" in the context of two or more elements of an RFID tag means that a conductive path exists through the elements that enable the elements to operate together.

In the illustrated examples, antenna 14 is coil shaped although other antenna designs are possible, such as a dipole. Circuitry provided by chip 12 may include modulators and voltage regulators, as known in the art. Chip 12 may have control logic that includes data encoding and decoding functions, as known in the art. Chip 12 includes memory, which may be an EEPROM for example, for storing information. Such information may be associated with the article on which the RFID tag is secured. Chip 12 and antenna 14 are secured to substrate 16, which may be made of paper (e.g., cardstock), polymer film, fabric, or other material.

Chip 12 stores data representing a predefined reading range. For example, the data may represent a distance in centimeters, inches, or other unit of measure. Chip 12 may store additional data, such an Electronic Product Code (EPC), Universal Product Code (UPC), or other product identifier. Antenna 14 comprises first antenna segment 14A and second antenna segment 14B operatively attached to first antenna segment 14A so as to form a conductive circuit with first antenna segment 14A. Second antenna segment 14B is configured to detach from first antenna segment 14A. After detachment, the reading range will be less than the predefined reading range. Thus, during a tamper detection procedure, an RFID reader will be unable to obtain the data from RFID chip 12 at the predefined reading range. The RFID reader used for tamper detection may be identical to or similar to the RFID reader used in the pre-testing procedure described above.

Detachment may occur by tearing or cutting of antenna 14. To allow for easy tearing or cutting, antenna 14 may have a thickness of less than 50 microns, or less than 30 microns, or less than 10 microns. The selected thickness may depend on the frequency of radio waves to which RFID tag 10 is designed to respond. For example, first antenna segment 14A and second antenna segment 14B may be a conductive trace made of metal. For example, the conductive trace may be a metal foil or metal particles carried by binder material. The conductive trace may have a thickness of less than 50 microns, or less than 30 microns, or less than 10 microns. Substrate 16 has detachment area 18 located between first antenna segment 14A and second antenna segment 14B. As described below, detachment area 18 facilitates detachment of second antenna segment 14B from first antenna segment 14B.

Figure 2:
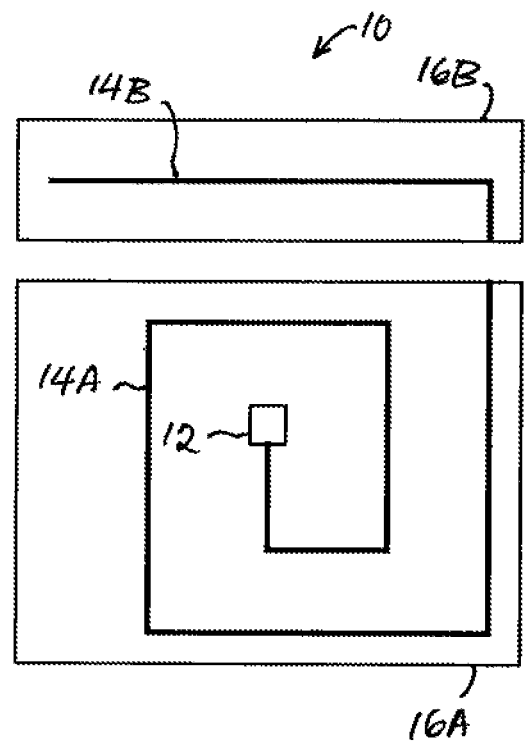
FIG. 2 is plan view showing the antenna in a modified state.

In FIG. 1, antenna 14 is in the initial state. In FIG. 2, antenna 14 is in the modified state. Antenna 14 is configured to transmit the data from chip 12 when antenna 14 is at the initial state and the modified state. In the initial state, first antenna segment 14A and second antenna segment 14B are operatively attached to chip 12. Thus, first antenna segment 14A and second antenna segment 14B collective transmit data from chip 12 in response to interrogation by an RFID reader. In the modified state, first antenna segment 14A is operatively attached to chip 12, and second antenna segment 14B is not operatively attached to chip 12. Thus, first antenna segment 14A transmits data from chip 12 in response to interrogation by an RFID reader, and second antenna segment 14B does not transmit data from chip 12 in response to interrogation by the RFID reader.

As shown in FIGS. 1 and 2, RFID tag 10 further comprises substrate 16 on which first antenna segment 14A and second antenna segment 14B are mounted. The antenna segments may be mounted by an adhesive between antenna 14 and substrate 16. Antenna 14 may be printed on substrate 16 such that upon drying, the antenna segments adhere to substrate 16.

Figure 3:
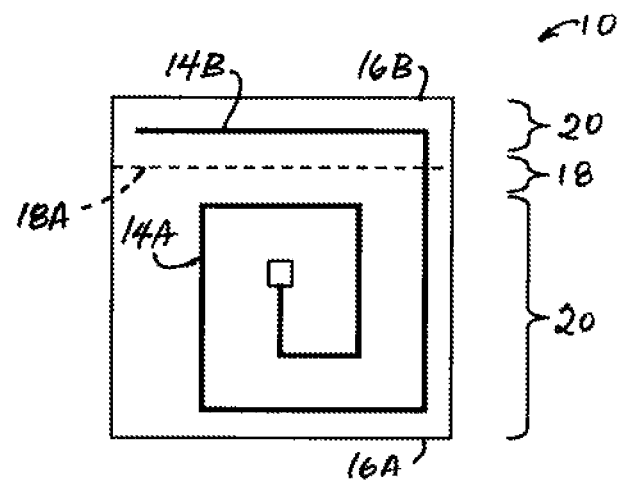
FIGS. 3-5 are plan view showing examples for a detachment area of a substrate on which the antenna is secured.
Figure 4:
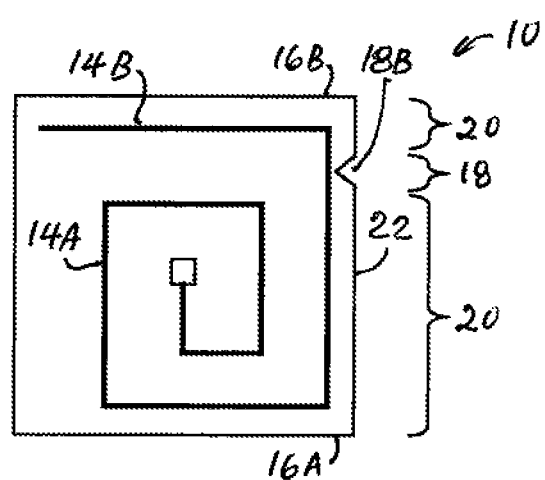
Figure 5:
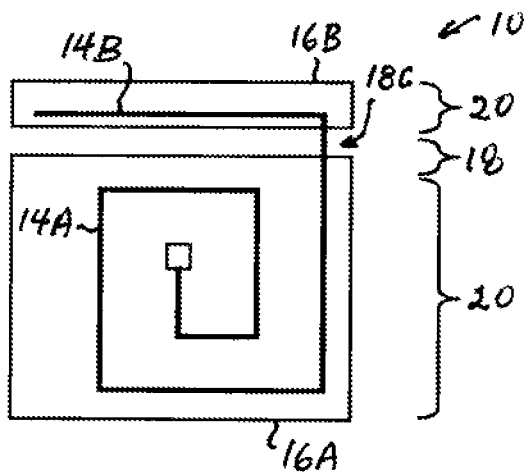

As shown in FIGS. 3-5, detachment area 18 of substrate 16 may have different forms. In these figures, antenna 14 is in the initial state. In FIG. 3, detachment area 18 is in the form of perforation 18A. Perforation 18A comprises a series of cuts or holes. Due to the perforation, detachment area 18 has a tensile strength less than that of areas 20 of substrate 16 adjacent to detachment area 18. The perforation facilitates detachment (e.g., tearing or cutting) of second antenna segment 14B from first antenna segment 14A.

In FIG. 4, detachment area 18 is in the form of notch 18B. As shown, notch 18B comprises a cut formed at edge 22 of substrate 16. The notch may be a groove into the surface of the substrate 16. Due to the notch, detachment area 18 has a tensile strength less than that of areas 20 of substrate 16 adjacent to detachment area 18. The notch facilitates detachment (e.g., tearing or cutting) of second antenna segment 14B from first antenna segment 14A.

In FIG. 5, detachment area 18 is in the form complete separation 18C. Complete separation 18C divides substrate 16 into separate and distinct substrate parts 16A and 16B. First substrate part 16A does not contact second substrate part 16B. First antenna segment 14A (FIG. 1) is secured to first substrate part 16A, and second antenna segment 14B (FIG. 1) is secured to second substrate part 16B. Detachment (e.g., tearing or cutting) of second antenna segment 14B from first antenna segment 14A is facilitated by the complete absence of substrate material in complete separation 18C.

As shown in FIG. 6 and FIG. 7, example system 30 comprises article 32 on which RFID tag 10 is secured. Article 32 comprises first article part 32A and second article part 32B movable relative to first article part 32A. First antenna segment 14A is disposed over and secured to first article part 32A. Second antenna segment 14B is disposed over and secured to second article part 32B. With movement of second article part 32B relative to first article part 32A, second antenna segment 14B remains secured to and moves with second article part 32B and detaches from first antenna segment 14A, which remains secured to first article part 32A.

Substrate 16 secures first antenna segment 14A to first article part 32A and secures second antenna segment 14B to second article part 32B. Securement may be achieved with an adhesive backing on substrate 16. Substrate 16 is disposed between first antenna segment 14A and first article part 32A and between second antenna segment 14B and second article part 32B. Detachment area 18 (FIG. 1) of substrate 16 is located at interface 34 (FIG. 6) between first article part 32A and second article part 32B. Interface 34 is a gap or area of contact between first article part 32A and second article part 32B. First article part 32A forms enclosure 36 that defines storage volume 38. Aperture 40 is formed through enclosure 36 to provide access to storage volume 38. Second article part 32B covers aperture 40. Article 32 includes connection region 42 having features that hold first article part 32A and second particle part 32B together.

Alternatively, the second article part may form an enclosure that defines a storage volume, and the first article part covers the aperture in the enclosure.

In FIG. 8, connection region 42 has screw threads 44 formed on first article part 32A that engage screw threads 46 formed on second article part 32B. The screw threads enable second article part 32B to be is screwed onto first article part 32A. After the article parts are screwed together, RFID tag 10 may be secured to article 32 at interface 34 (FIG. 6). At such time, antenna 14 is at its initial state. Second article part 32B is configured to unscrew from first article part 32A. When second article part 32B is unscrewed, second antenna segment 14B detaches from first antenna segment 14A. At such time, antenna 14 is at its modified state.

In FIG. 9, connection region 42 has hinge 48. Hinge 48 includes hinge pin 50 that extends through first article part 32A and second article part 32B. Alternatively, the hinge may be in the form of a living hinge, as is known in the art. A living hinge is a thin, flexible member made from the same material (e.g., a thermoplastic) as first article part 32A and second article part 32B. Alternatively, the hinge may be a fold in material (e.g., a plastic film or cellulosic paper) that allows second article part 32B to function as a closure flap for a storage volume formed by first article part 32A. These and other types of hinges allow second article part 32B to pivot on the hinge and thereby move relative to first article part 32A. When second article part 32B pivots, second antenna segment 14B detaches from first antenna segment 14A. At such time, antenna 14 is at its modified state.

Figure 10:
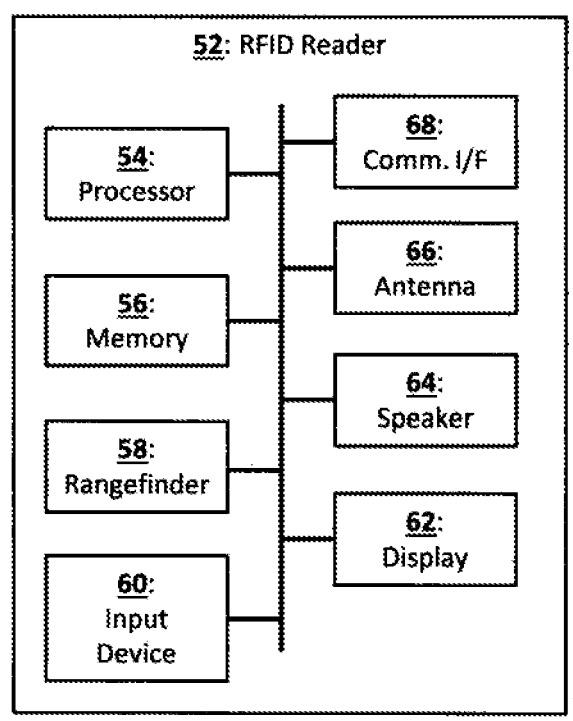
FIG. 10 is a block diagram showing elements of the RFID reader.

Referring again to FIG. 6, system 30 comprises RFID reader 52. As shown in FIG. 10, RFID reader 52 comprises computer processor 54, memory 56, laser rangefinder 58, input device 60, display device 62, speaker 64, and antenna 66 configured to emit radio waves toward RFID tag 10. Antenna 66 may include a coil, tuning circuit, and other electronics, as known in the art. Laser rangefinder 58 includes a laser and pickup sensor for determining a distance between RFID reader 52 and RFID tag 10. Input device 60 includes any of a numeric keypad and touch screen. Display device 62 may be a light emitter (e.g., LED light) or a display screen (e.g., LCD screen). RFID reader 52 also comprises communication interface 68 having circuitry enabling wireless (e.g., radio frequency) or wired communication with a host computer.

With RFID reader 52 located at the predefined range or closer to RFID tag 10 (FIG. 6), the radio waves (W) from RFID reader 52 cause the RFID tag 10 to respond with data from chip 12 of RFID tag 10. RFID reader 52 is configured to obtain the data stored in chip 12 from a transmission by RFID tag antenna 14 at the initial state and the modified state.

RFID reader 52 is configured to determine the predefined reading range from the data obtained from RFID tag 10. For example, processor 54 may decode the data obtained from RFID tag 10 to obtain the predefined reading range. For example, the data obtained from RFID tag 10 may contain a code, and processor 54 associates the code with the predefined reading range stored in memory 56. RFID reader 52 is configured to compare the determined predefined reading range with the actual reading range at which the data was obtained by RFID reader 52 from RFID tag 10. RFID reader 52 may determine the actual reading range by position thresholding, signal thresholding, or other test technique known in the art. Additionally or alternatively, RFID reader 52 may determine the actual reading range with aid from laser rangefinder 58 or by manual user entry into input device 60. RFID reader 52 is configured to generate a visual and/or audio signal based on the comparison between the predefined reading range and the actual reading range. The visual signal may be a flashing light, text or image shown on display device 62. The audio signal may be sound from speaker 64. The visual and/or audio signal would indicate that antenna 14 is at the modified or initial state, which a person may interpret as indicating whether or not article 32 has been tampered with.

Figure 11:
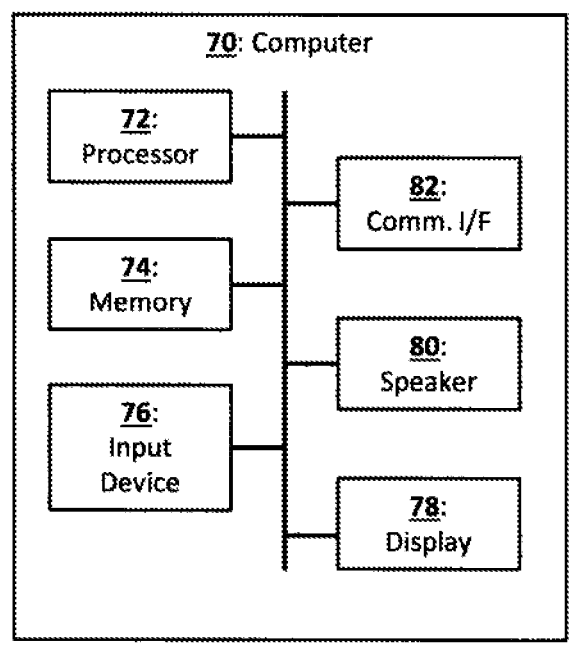
FIG. 11 is a block diagram showing elements of the host computer.

Referring again to FIG. 6, system 30 comprises host computer 70 in communication with RFID reader 52. As shown in FIG. 11, computer 70 comprises computer processor 72, memory 74, input device 76, display device 78, speaker 80, and communication interface 82 having circuitry enabling wireless (e.g., radio frequency) or wired communication with RFID reader 52. Input device 76 includes any of a numeric keypad and touch screen. Display device 78 may be a light emitter (e.g., LED light) or a display screen (e.g., LCD screen).

Computer 70 is configured to determine the predefined reading range from the data obtained by RFID reader 52 from RFID tag 10. For example, computer 70 may obtain the data from RFID reader 52 through communication interface 82. Processor 72 may decode the data to obtain the predefined reading range. For example, the data obtained from RFID reader 52 may contain a code, and processor 72 associates the code with the predefined reading range stored in memory 74. Computer 70 is configured to compare the determined predefined reading range with an actual reading range at which the data was obtained by RFID reader 52 from RFID tag 10. For example, computer 70 may obtain the actual reading range from RFID reader 52 through communication interface 82. Additionally or alternatively, computer 70 may obtain the actual reading range through manual user entry into input device 76.

Computer 70 is configured to generate a signal based on the comparison between the predefined reading range and the actual reading range. The signal may be communicated to RFID reader 52, which uses the signal to generate a visual and/or audio signal, as previously described. The signal generated by computer 70 may be a visual and/or audio signal. The visual signal may be a flashing light, text or image shown on display device 78. The audio signal may be sound from speaker 80. The visual and/or audio signal from RFID reader 52 and/or computer 70 would indicate that antenna 14 is at the modified or initial state, which a person may interpret as indicating whether or not article 32 has been tampered with.

Figure 12:
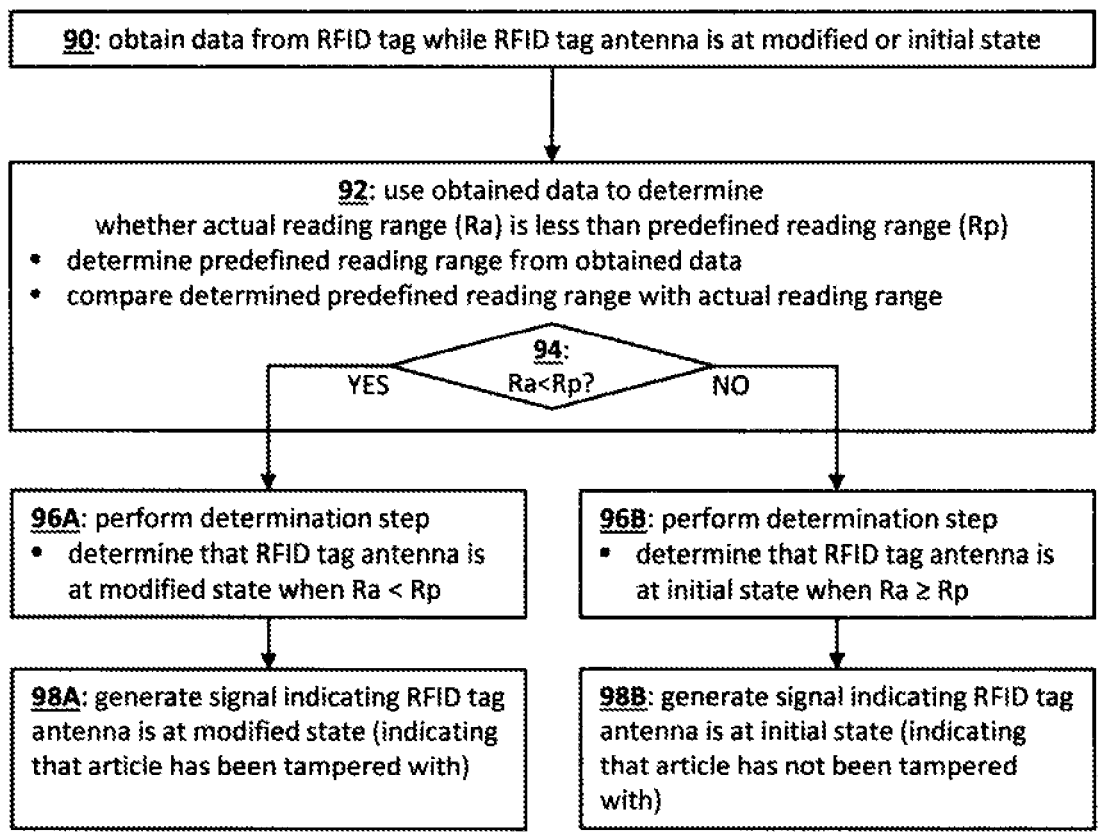

FIG. 12 shows an example RFID reading method, which may form part of a temper detection procedure. At block 90, RFID reader 52 is used to obtain range data from RFID tag 10 while RFID tag antenna 14 is at either the modified state or initial state. The range data represents a predefined reading range. The range data is obtained by RFID reader 52 at an actual reading range, which is the maximum distance between RFID reader 52 and RFID tag 10 at which RFID reader 52 can obtain range data from RFID tag 10. At block 90, RFID reader 52 may also be used to obtain product identifier data, such as an Electronic Product Code (EPC) or Universal Product Code (UPC).

In the modified state, the size (e.g., length and/or area) of RFID antenna 14 is smaller as compared to when RFID antenna 14 is at the initial state. With a smaller size, RFID antenna 14 has a reduced ability to derive power from radio waves from RFID reader 52 and/or reduced ability to transmit a response to interrogation by RFID reader 52. The predefined reading range is the range of RFID tag 10 with antenna 14 in the initial state. Thus, with antenna 14 in the modified state, the actual reading range is expected to be less than the predefined reading range. Conversely, with antenna 14 in the initial state, the actual reading range is expected to be greater than or equal to the predefined reading range.

At block 92, the processor of RFID reader 52 or computer 70 uses the obtained range data to determine whether the actual reading range (Ra) is less than the predefined reading range (Rp). At block 96A or 96b, a determination step is performed. At block 96A, the determination step comprises determining that antenna 14 is at the modified state when Ra is determined to be less than Rp. At block 96B, the determination step comprises determining that antenna 14 is at the initial state when the Ra is determined to be not less than Rp.

As shown in block 92, using the obtained range data comprises determining the predefined reading range (Rp) from the obtained range data, and comparing the determined predefined reading range (Rp) with the actual reading range (Ra). The determination and comparison may be performed by the processor of RFID reader 52 or computer 70, as previously described.

At block 98A or 98B, a signal is generated to indicate that antenna 14 is at the initial or modified state. The signal is based on the comparison of Rp with Ra. The signal is generated by RFID reader 52 or computer 70, as previously described.

As previously mentioned, RFID tag antenna 14 is at either the modified state or initial state when range data is obtained from RFID tag 10 at block 90. When RFID tag antenna 14 is at the modified state at block 90, use of the obtained range data at block 92 comprises determining that the actual reading range (Ra) is less the predefined reading range (Rp), as indicated by YES at block 94. Thus at block 98A, a signal is generated indicating that antenna 14 is at the modified state. From this signal, a person may ascertain that article 32 has been tampered with.

When RFID tag antenna 14 is at the initial state at block 90, use of the obtained range data at block 92 comprises determining that the actual reading range (Ra) is not less the predefined reading range (Rp), as indicated by NO at block 94. Thus at block 98B, a signal is generated indicating that antenna 14 is at the initial state. From this signal, a person may ascertain that article 32 has not been tampered with.

The figures herein illustrate RFID tag 10 as a non-limiting example of a passive RFID tag configuration. It is contemplated that RFID tag 10 may be of another passive RFID tag configuration having a first antenna segment and a second antenna segment operatively attached to the first antenna segment and configured to detach from the first antenna segment. Passive RFID tags are useful due to their relatively low cost, though it is also contemplated that RFID tag 10 may have the configuration of a semi-passive or active RFID tag having a first antenna segment and a second antenna segment operatively attached to the first antenna segment and configured to detach from the first antenna segment.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. An RFID tag comprising:
a chip storing data representing a predefined reading range; and
an antenna comprising a first antenna segment and a second antenna segment operatively attached to the first antenna segment so as to form a circuit with the first antenna segment, the second antenna segment configured to detach from the first antenna segment, the antenna having an initial state in which the first antenna segment is attached to the second antenna segment and a modified state in which the first antenna segment is detached from the second antenna segment, the antenna configured to transmit the data representing the predefined reading range from the chip when the antenna is at the initial state and the modified state to enable determination whether an actual reading range of the chip is greater than or less than the predefined reading range, the actual reading range being less than the predefined reading range indicating the modified state, the actual reading range being not less than the predefined reading range indicating the initial state.

2. The RFID tag of claim 1, wherein the RFID tag further comprises a substrate on which the first antenna segment and the second antenna segment are mounted, and the substrate has a perforation, complete separation, or notch located between the first antenna segment and the second antenna segment.

3. An RFID system comprising:
an article comprising a first article part and a second article part movable relative to the first article part; and
an RFID tag comprising
a chip storing data representing a predefined reading range, and
an antenna comprising a first antenna segment and a second antenna segment operatively attached to the first antenna segment so as to form a circuit with the first antenna segment, the second antenna segment configured to detach from the first antenna segment, the antenna having an initial state in which the first antenna segment is attached to the second antenna segment and a modified state in which the first antenna segment is detached from the second antenna segment, the antenna configured to transmit the data representing the predefined reading range from the chip when the antenna is at the initial state and the modified state to enable determination whether an actual reading range of the chip is greater than or less than the predefined reading range, the actual reading range being less than the predefined reading range indicating the modified state, the actual reading range being not less than the predefined reading range indicating the initial state,
wherein the first antenna segment is disposed over and secured to the first article part, and the second antenna segment is disposed over and secured to the second article part such that, with movement of the second article part relative to the first article part, the second antenna segment moves with the second article part and detaches from the first antenna segment.

4. The RFID system of claim 3, wherein the RFID tag further comprises a substrate that secures the first antenna segment to the first article part and secures the second antenna segment to the second article part, the substrate disposed between the first antenna segment and the first article part and between the second antenna segment and the second article part, and the substrate has a perforation, complete separation, or notch located at an interface between the first article part and the second article part.

5. The RFID system of claim 3, wherein one of the first article part and the second particle part forms an enclosure that defines a storage volume, an aperture is formed through the enclosure, and the other of the first article part and the second particle part covers the aperture.

6. The RFID system of claim 3, wherein the second article part is screwed onto the first article part, and the second article part is configured to unscrew from the first article part.

7. The RFID system of claim 3, wherein the second article part is attached by a hinge onto the first article part, and the second article part is configured to pivot on the hinge.

8. The RFID system of claim 3, further comprising an RFID reader, wherein the RFID reader is configured to obtain the data stored in the chip from a transmission by the antenna at the initial state and the modified state.

9. The RFID system of claim 8, wherein the RFID reader is configured to determine the predefined reading range from the data obtained from the RFID tag.

10. The RFID system of claim 9, wherein the RFID reader is configured to compare the determined predefined reading range with an actual reading range at which the data is obtained by the RFID reader from the RFID tag, and to generate a visual or audio signal based on the comparison.

11. The RFID system of claim 8, further comprising a computer configured to communicate with the RFID reader and to determine the predefined reading range from the data obtained by the RFID reader from the RFID tag.

12. The RFID system of claim 11, wherein the computer is configured to compare the determined predefined reading range with an actual reading range at which the data is obtained by the RFID reader from the RFID tag, and to generate a signal based on the comparison.

13. An RFID reading method comprising:
obtaining data from an RFID tag by using an RFID reader, the data representing a predefined reading range and being obtained by the RFID reader at an actual reading range, the RFID tag comprising a chip and an antenna, the chip storing the data, the antenna comprising a first antenna segment and a second antenna segment operatively attached to the first antenna segment so as to form a circuit with the first antenna segment, the second antenna segment configured to detach from the first antenna segment, the antenna having an initial state in which the first antenna segment is attached to the second antenna segment and a modified state in which the first antenna segment is detached from the second antenna segment; and using the obtained data to determine whether the actual reading range is less than the predefined reading range; and performing a determination step comprising either determining that the antenna is at the modified state when the actual reading range is determined to be less than the predefined reading range, or determining that the antenna is at the initial state when the actual reading range is determined to be not less than the predefined reading range.

14. The RFID reading method of claim 13, wherein:
the using of the obtained data comprises determining the predefined reading range from the obtained data, and comparing the determined predefined reading range with the actual reading range; and the method further comprises generating a signal indicating that the antenna is at the initial or modified state, the signal based on the comparing of the determined predefined reading range with the actual reading range.

15. The RFID reading method of claim 13, wherein during the obtaining of the data, the RFID tag is secured to an article, the article comprises a first article part and a second article part movable relative to the first article part, the first antenna segment is disposed over and secured to the first article part, and the second antenna segment is disposed over and secured to the second article part.

16. The RFID reading method of claim 15, wherein one of the first article part and the second particle part forms an enclosure that defines a storage volume, an aperture is formed through the enclosure, and the other of the first article part and the second particle part covers the aperture.

17. The RFID reading method of claim 13, wherein:
the obtaining of data from the RFID tag is performed while the antenna of the RFID tag is at the modified state, the using of the obtained data comprises determining that the actual reading range is less the predefined reading range, and the performing of the determination step comprises determining that the antenna is at the modified state.

18. The RFID reading method of claim 17, further comprising generating, in response to the determination step, a signal indicating that the antenna is at the modified state.

19. The RFID reading method of claim 13, wherein:
the obtaining of data from the RFID tag is performed while the antenna of the RFID tag is at the initial state, and the using of the obtained data comprises determining that the actual reading range is not less the predefined reading range, and the performing of the determination step comprises determining that the antenna is at the initial state.

20. The RFID reading method of claim 19, further comprising generating, in response to the determination step, a signal indicating that the antenna is at the initial state.

* * * * *